US010615712B2

(12) United States Patent
Park et al.

(10) Patent No.: US 10,615,712 B2
(45) Date of Patent: Apr. 7, 2020

(54) SELF-POWERED CLOCK INPUT BUFFER (71) Applicant: QUALCOMM Incorporated, San Diego, CA (US)

(72) Inventors: Dongmin Park, San Diego, CA (US); Jong Min Park, San Diego, CA (US); Lai Kan Leung, San Marcos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 15/349,432

(22) Filed: Nov. 11, 2016

(65) Prior Publication Data
US 2018/0138822 A1 May 17, 2018

(51) Int. Cl.
G01R 19/22 (2006.01)
H02M 7/217 (2006.01)
G06K 19/07 (2006.01)

(52) U.S. Cl.
CPC ........ H02M 7/217 (2013.01); G06K 19/0707 (2013.01); G06K 19/0715 (2013.01); G06K 19/0723 (2013.01)

(58) Field of Classification Search
CPC .................................................... H02M 7/217
USPC ........................................................ 327/104
See application file for complete search history.

(56) References Cited

U.S. PATENT DOCUMENTS 8,674,753 B2 3/2014 Gu
8,872,578 B1 10/2014 Pelley

| 2002/0001204 A1* | 1/2002 | Lentini | H02M 3/33592 363/21.06 |
|---|---|---|---|
| 2005/0105231 A1 | 5/2005 | Hamel et al. | |
| 2007/0126486 A1* | 6/2007 | Lee | H03K 3/012 327/218 |
| 2007/0223639 A1* | 9/2007 | Unterricker | H03L 7/081 375/376 |

(Continued)

FOREIGN PATENT DOCUMENTS

EP 2685220 A2 1/2014

OTHER PUBLICATIONS

International Search Report and Written Opinion—PCT/US2017/056575—ISA/EPO—dated Jan. 25, 2018.

(Continued)

Primary Examiner — Metasebia T Retebo
(74) Attorney, Agent, or Firm — Paradice and Li LLP/Qualcomm (57) ABSTRACT A method and system for self-powering a clock input buffer is disclosed. The system includes an input node adapted to receive an alternating current (AC) signal having an instantaneous voltage oscillating between a minimum voltage and a maximum voltage. The system includes a pass transistor having a voltage controlled terminal, a first transfer terminal, and a second transfer terminal. The first transfer terminal connects to the input node and the second transfer terminal connects to a power node. The circuit also includes a plurality of transistors adapted to form a logic gate connected to the power node, and having a sensing terminal connected to the input node and an output terminal connected to the voltage controlled terminal. The logic gate produces a control voltage on the output terminal in response to an input voltage on the sensing terminal. The circuit also includes an energy-storage element having a first terminal connected to the power node.

25 Claims, 3 Drawing Sheets (56) References Cited

U.S. PATENT DOCUMENTS

| | | | |
|---|---|---|---|
| 2009/0103333 A1* | 4/2009 | Trattler | H02M 3/1588 |
| | | | 363/17 |
| 2011/0096578 A1* | 4/2011 | Fang | H02M 3/33592 |
| | | | 363/127 |
| 2011/0109347 A1 | 5/2011 | Rao | |
| 2011/0149623 A1* | 6/2011 | Peak, Jr. | H02M 7/217 |
| | | | 363/127 |
| 2011/0292855 A1 | 12/2011 | Saha et al. | |
| 2012/0235723 A1* | 9/2012 | Oppelt | H03K 5/086 |
| | | | 327/184 |
| 2014/0071722 A1 | 3/2014 | Gao et al. | |

OTHER PUBLICATIONS

Huang Y-J., et al., "A Self-Powered CMOS Reconfigurable Multi-Sensor SoC for Biomedical Applications", IEEE Journal of Solid-State Circuits, vol. 49, No. 4, Apr. 2014, pp. 851-866.

Xu C., et al., "Analysis of Clock Buffer Phase Noise", Circuits and Systems, IEEE International Symposium on, vol. 5, 2002, pp. V-657-V-660.

\* cited by examiner

SELF-POWERED CLOCK INPUT BUFFER

BACKGROUND

Aspects of the present disclosure relate generally to telecommunications, and more particularly, to self-powered clock input buffer.

Phase noise is the frequency domain representation of random fluctuations in the phase of a waveform. A phase-locked loop or a synthesizer in a modern wireless transceiver must meet stringent phase noise requirements in order to operate at high data rates. Although synthesizers may be designed for optimal phase noise performance, such performance is often limited by the noise on the reference input clock, which tends to be dominated by the loading of the Printed Circuit Board (PCB) reference input clock path. For example, an external regulator such as a Power Module Integrated Circuit (PMIC) provides power to the synthesizer block of most wireless transceivers. In addition, regulators also provide the reference input clock that the synthesizer uses to generate higher frequency clock signals. Yet, since the PMIC is external to the transceiver chip, it must drive the reference input clock across the PCB and through other device interconnects to reach the clock input buffer of the transceiver. Consequently, the signal integrity of the reference input clock (e.g., rise time, fall time, and jitter) at the input of the transceiver degrades, which causes an increase in the overall phase noise of the transceiver.

Conventional systems counter the effects of reference input clock noise on transceiver phase noise by powering the clock input buffer with a clean supply from a high quality regulator (e.g., good PSRR performance). However, these regulators generally consume more power, take up more space, and cost more.

Accordingly, there remains a need in the art for methods to improve the phase-noise performance of a synthesizer in a telecommunication circuit, without a trade-off on other critical performance parameters.

SUMMARY

The disclosure is directed to a self-powered clock input buffer that rectifies alternating-current (AC) voltage of a reference input clock into a direct-current (DC) voltage to power the input buffer.

The self-powered clock input buffer described herein utilizes a circuit configuration that results in various advantages over the art. For example, a self-powered clock input buffer makes a synthesizer more tolerant to a poorly performing, low-cost regulator. The regulator may power the synthesizer with a lower voltage supply (e.g., VDD) and provide a reference input clock with slower rise/fall times and a smaller peak-peak voltage swing. This allows the system designer to select an external regulator that is both less bulky and less power-hungry, while still achieving optimal phase noise performance for the synthesizer.

In addition, a synthesizer utilizing the self-powered input buffer may not always need an external regulator to operate. Advantageously, a synthesizer powered from a self-powered clock input buffer tends to have faster start-up times than a traditional clock input buffer powered by an external regulator.

The self-powered input clock buffer also eliminates the need for large DC blocking capacitors. For example, synthesizer circuits generally use in-series capacitors to block the DC component of the reference input clock. As a result, circuit designers must position the reference input clock source (e.g., external regulator) further from the transceiver to make room on the printed circuit board for the DC blocking capacitors. The longer distance between the components requires longer PCB traces, which further degrades the signal integrity of the reference input clock. Therefore, the elimination of the DC blocking capacitors further helps to improve the phase noise for the synthesizer.

One implementation disclosed herein is a circuit for self-powering a clock input buffer. The circuit includes an input node adapted to receive an alternating current (AC) signal having an instantaneous voltage oscillating between a minimum voltage and a maximum voltage. The circuit also includes a pass transistor having a voltage controlled terminal, a first transfer terminal connected to the input node, and a second transfer terminal connected to a power node. The circuit also includes a plurality of transistors adapted to form a logic gate connected to the power node, and having a sensing terminal connected to the input node and an output terminal connected to the voltage controlled terminal. The logic gate configured to produce a control voltage on the output terminal in response to an input voltage on the sensing terminal. The circuit also includes an energy-storage element having a first terminal connected to the power node.

In some implementations, the power node is coupled to both the pass transistor and the energy-storage element to receive power from both the energy-storage element and the AC signal. In other implementations, the input node is directly coupled to a signal source that provides the AC signal. In other implementations, the logic gate is an inverter circuit. In some implementations, the AC signal powers the logic gate when the instantaneous voltage of the AC signal rises above the voltage source provided by the energy-storage element.

In some implementations, the plurality of transistors comprises a first transistor having a first source terminal connected to the power node, a first gate terminal connected to the sensing terminal, and a first drain terminal connected to the output terminal. In some implementations, the circuit includes a second transistor having a second source terminal connected to a ground connection. In some implementations, a second gate terminal connected to the first gate terminal, and a second drain terminal connected to the output terminal.

In some implementations, the first transistor is a PMOS transistor and the second transistor is an NMOS transistor. In other implementations, the circuit further includes a current-blocking element having a first blocking terminal connected to the second transfer terminal of the pass transistor and a second blocking terminal connected to the node. The current-blocking element substantially blocks a current flow from the second blocking terminal to the first blocking terminal when the AC signal provides a logical low-voltage state on the input node of the logic gate and the logic gate provides a logical low-voltage state on the voltage controlled terminal of the pass transistor.

In some implementations, the system further includes a phase-lock loop configured to receive the AC signal via the input node and use the AC signal as a reference clock. In some implementations, the circuit further includes a clock buffer connected to the node, wherein the node provides the only source of power to the clock buffer. In some implementations, the input node is AC coupled to a signal source that provides the AC signal.

In another aspect, the present disclosure is directed to a method for self-powering a clock input buffer. The method includes receiving, by an input node, an alternating current (AC) signal having an instantaneous voltage oscillating between a minimum voltage and a maximum voltage. The method also includes producing a control voltage based on the AC signal, transferring the AC signal to a power node during a first portion of a cycle of the AC signal based on the control voltage, the transferred AC signal charges an energy-storage element and providing a first source voltage at the power node, and discharging the energy storage element during a second portion of the cycle of the AC signal to provide a second source voltage at the power node.

In some implementations, the method further includes charging the energy storage element when the instantaneous voltage of the AC signal rises above the second source voltage provided by the energy-storage element. In some implementations, the method includes producing the control voltage based on the AC signal comprises inverting a logic state of the AC signal. In some implementations, the method includes transferring the AC signal comprises receiving the control voltage at a control terminal of a pass transistor to activate the pass transistor. Activating the pass transistor causes transfer of a voltage between a first transfer terminal of the pass transistor connected to the input node and a second transfer terminal of the pass transistor connected to the power node.

In some implementations, the method further includes blocking a current flow using a current-blocking element having a first blocking terminal connected to the second transfer terminal of the pass transistor and a second blocking terminal connected to the power node. In some implementations, the method includes producing the control voltage comprises inverting a logic state of the AC signal using a plurality of transistors adapted to form a logic gate. The logic gate having a sensing terminal connected to the input node and an output terminal connected to the control terminal of the pass transistor.

In some implementations, the method further comprises providing power to the logic gate from the AC signal when the instantaneous voltage of the AC signal rises above the voltage source provided by the energy-storage element. In some implementations, the method further includes providing power to the logic gate from the second source voltage when the instantaneous voltage of the AC signal falls below the second source voltage. In some implementations, receiving the AC signal comprises receiving a DC signal component of the AC signal. In some implementations, the method further comprises buffering a clock signal with a clock buffer connected to the power node, wherein the power node provides the only source of power to the clock buffer. In some implementations, the method further includes providing the AC signal as a reference clock to a phase-lock loop.

In some implementations, the AC signal is received only via the input node. In some implementations, the method further includes rectifying the AC signal to produce a direct current (DC) voltage at the power node.

In another aspect, the present disclosure is directed a circuit for self-powering a clock input buffer. In some implementations, the circuit includes an input node adapted to receive an alternating current (AC) signal having an instantaneous voltage oscillating between a minimum voltage and a maximum voltage; the input node being directly coupled to a signal source that provides the AC signal. In some implementations, the circuit includes a rectifier having a first input terminal connected to the input node and a second terminal connected to a power node. In some implementations, the circuit includes an energy-storage element connected to the power node. In some implementations, the AC signal is a reference clock for a phase-lock loop. In some implementations, the circuit further includes a clock buffer adapted to receive a direct-current voltage from the power node as an only source of power to the clock buffer.

In another aspect, the present disclosure is directed a method for self-powering a clock input buffer. The method includes receiving, by an input node, an alternating current (AC) signal having an instantaneous voltage oscillating between a minimum voltage and a maximum voltage. The method also includes converting the AC signal into a direct-current voltage. In some implementations, the method includes storing the direct current voltage in a storing element; and discharging the direct current voltage into a clock buffer, the direct-current voltage comprising an only source of power to the clock buffer. In some implementations, the method includes receiving an AC signal comprises receiving a DC signal component of the AC signal.

BRIEF DESCRIPTION OF THE DRAWINGS

The accompanying drawings, which are incorporated herein and constitute part of this specification, illustrate examples described in the disclosure, and together with the general description given above and the detailed description given below, serve to explain the features of the various implementations.

Like reference numbers and designations in the various drawings indicate like elements.

DETAILED DESCRIPTION

Various implementations will be described in detail with reference to the accompanying drawings. Wherever possible, the same reference numbers may be used throughout the drawings to refer to the same or like parts. Different reference numbers may be used to refer to different, same, or similar parts. References made to particular examples and implementations are for illustrative purposes, and are not intended to limit the scope of the disclosure or the claims.

It should be understood that implementations of the present disclosure may be used in a variety of applications. Although the present disclosure is not limited in this respect, the circuits disclosed herein may be used in many apparatuses such as in the transmitters and receivers of a radio system. Radio systems intended to be included within the scope of the present disclosure include, by way of example only, cellular radiotelephone communication systems, satellite communication systems, two-way radio communication systems, one-way pagers, two-way pagers, personal communication systems (PCS), personal digital assistants (PDA's) and the like.

Figure 1:
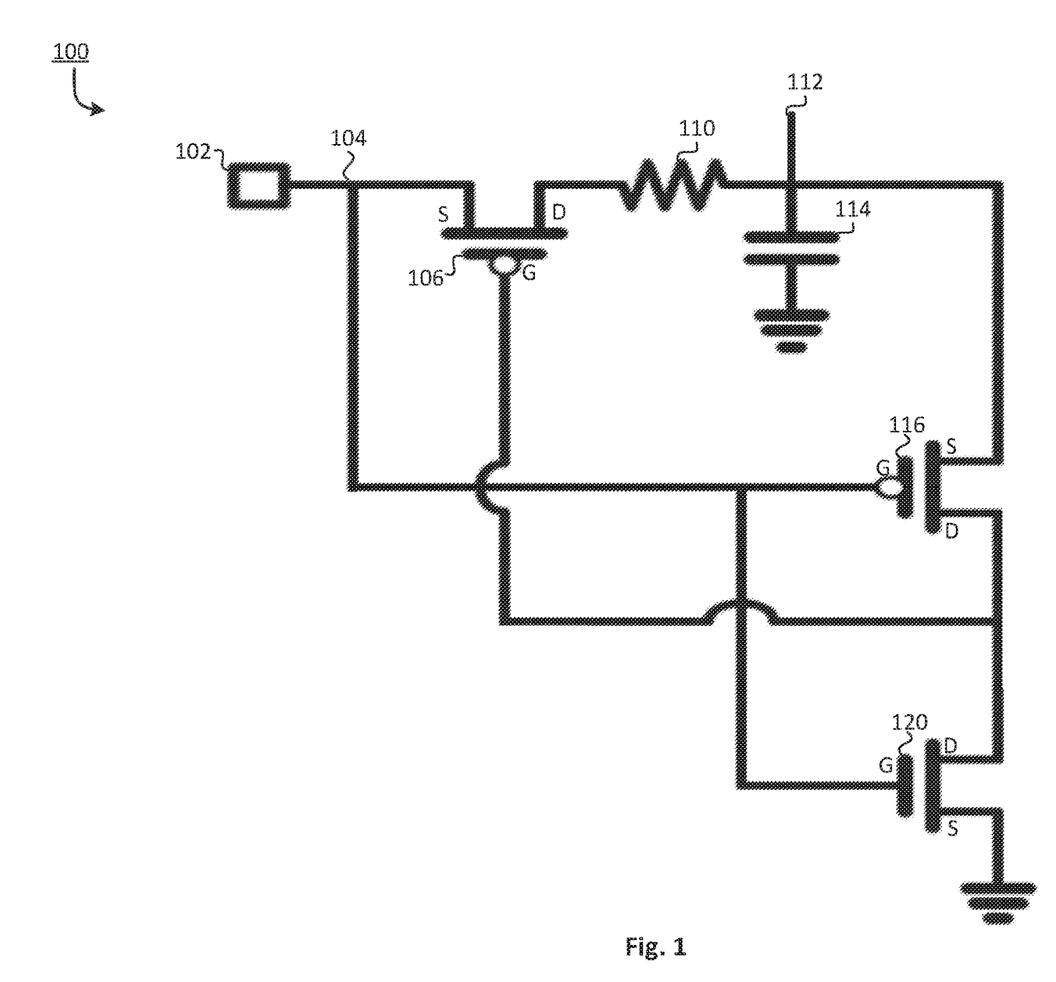
FIG. 1 is a circuit diagram depicting a self-powered clock input buffer that rectifies an alternating-current (AC) voltage of a reference input clock for a phase-locked loop into a direct-current (DC) voltage to power the clock input buffer, in accordance with an illustrative implementation.

Types of cellular radiotelephone communication systems intended to be within the scope of the present disclosure include, but are not limited to, Frequency Division Multiple Access (FDMA) systems, Time Division Multiple Access (TDMA) systems, Extended-TDMA (E-TDMA) cellular radiotelephone systems, Global System for Mobile Communications (GSM) systems, Code Division Multiple Access (CDMA) systems (particularly, Evolution-Data Optimized (EVDO) systems), CDMA-2000 systems, Universal Mobile Telecommunications Systems (UMTS) (particularly, Wideband Code Division Multiple Access (WCDMA), Long Term Evolution (LTE) systems, Single Radio LTE (SRLTE) systems, Simultaneous GSM and LTE (SGLTE) systems, High-Speed Downlink Packet Access (HSDPA) systems, and the like), Code Division Multiple Access 1× Radio Transmission Technology (1×) systems, General Packet Radio Service (GPRS) systems, Wi-Fi systems, Bluetooth systems, Near-Field Communication systems, Personal Communications Service (PCS) systems, and other protocols that may be used in a wireless communications network or a data communications network FIG. 1 is a circuit diagram depicting a self-powered clock input buffer that rectifies an alternating-current (AC) voltage of a reference input clock for a phase-locked loop into a direct-current (DC) voltage to power the clock input buffer, in accordance with an illustrative implementation. The self-powered clock input buffer produces a DC voltage from an AC signal to power the clock input buffer, and other downstream components connected to the buffer, by charging and discharging one or more capacitors to rectify the AC signal. In general, a reference input clock source drives a reference input clock intended for a phase-locked loop (PLL) into both the source terminal of a pass transistor and an inverter. When the reference input clock transitions into a high-voltage logic state, the inverter produces a low-voltage logic state on its output, which drives the gate terminal of the pass transistor. This low-voltage logic state activates the pass transistor, allowing it to pass the instantaneous voltage of the reference input clock on its source terminal to its drain terminal. A resistor connects between the drain terminal of the pass transistor and a power node that also connects to a first terminal of an energy storage element such as a capacitor (having its second terminal tied to ground or to a power supply lower in voltage than the power node), a power supply terminal (e.g., VDD input) of the inverter, and a power supply terminal for powering one or more downstream devices (e.g., a clock buffer adapted to buffer a clock signal, VCO, PLL). Activation of the pass transistor allows the reference input clock to force a charge across the resistor and into the capacitor. Accordingly, during this charging phase, the reference input clock provides power to both the capacitor and the clock input buffer, including any downstream devices connected to the capacitor.

Conversely, when the reference input clock transitions into a low-voltage logic state, the inverter output switches to a high-voltage logic state. This deactivates the pass transistor, preventing the transfer of the instantaneous voltage of the reference input clock from its drain terminal to its source terminal, and allows the capacitor to discharge through the inverter and the downstream devices. During this discharging phase, the inverter of the input clock buffer and the downstream device each draw power from the capacitor.

As indicated in FIG. 1, circuit 100 includes a reference input clock source 102, a current blocking element 110, and a capacitor 114. Circuit 100 also includes a p-channel metal oxide semiconductor field-effect (PMOS) transistor 106, a PMOS transistor 116, and an n-channel metal oxide semiconductor field-effect (NMOS) transistor 120; referred to generally as transistors 106, 116, 120. Circuit 100 may be implemented as an integrated circuit (IC), implemented using only discrete components, or implemented using any combination of components thereof. In another implementation, circuit 100 can include fewer, additional, and/or different components.

Reference input clock source 102 drives a reference input clock signal, intended to serve as the frequency and/or phase reference clock for a phase-locked loop (PLL), into the source terminal of PMOS transistor 106 and the common gate terminal connection of PMOS transistor 116 and NMOS transistor 120 via an input node 104. In some implementations, reference clock source 102 transmits the reference input clock signal to a sensing terminal connected to the common gate terminal connection of PMOS transistor 116 and NMOS transistor 120. Reference input clock source 102 may be a quartz crystal oscillator (XO), a voltage-controlled crystal oscillator (VCXO), a clock from a signal generator, a clock from an upstream system device, or a clock from a PMIC module, or any other suitable clock source. The reference input clock signal may AC-couple to PMOS transistor 106 and the common gate terminal connection of PMOS transistor 116 and NMOS transistor 120 through a series DC-blocking capacitor (not shown). For example, reference clock source 102 may connect to PMOS transistor 106 and the common gate terminal connection of PMOS transistor 116 through a series capacitor (not shown) that blocks the direct current (DC) signal component of the reference input clock signal. In some implementations, the reference input clock signal may directly couple or DC-couple to PMOS transistor 106 and the common gate terminal connection of PMOS transistor 116 and NMOS transistor 120. For example, reference clock source 102 may directly connect to PMOS transistor 106 and the common gate terminal connection of PMOS transistor 116 without a series capacitor. Accordingly, the DC voltage component of the reference input clock signal provides a DC bias for PMOS transistor 116 and NMOS transistor 120. The reference input clock signal may be a sinewave, a square wave, a triangle wave, a sawtooth wave, or any other suitable waveform for a clock signal.

The connections of transistors 116, 120 form a combinational logic circuit. As shown in FIG. 1, the source terminal of PMOS transistor 116 connects to power supply node 112 and the source terminal of NMOS 120 connects to ground. In some implementations, the source terminal of NMOS 120 connects to a second power supply (VSS) instead of connecting to ground. The second power supply (VSS) may be a negative voltage or a positive voltage. Transistors 116, 120 share a common gate terminal connection and a common drain terminal connection effectively forming an inverter circuit. That is, the output voltage on the common drain terminal connection of transistors 116, 120 represents a voltage logic state opposite to the voltage logic state on their common gate terminal connection. For example, as reference input clock source 102 drives the common gate terminal connection of transistors 116, 120 with a low-voltage logic state from the reference input clock signal, NMOS transistor 120 stops conducting (i.e., turns off) between its drain terminal and its source terminal. In contrast, PMOS transistor 116 starts to conducts (i.e., turns on) between its drain terminal and its source terminal, effectively forming a channel between the drain terminal and the source terminal of PMOS transistor 116. Thus, the voltage state on the drain terminal of each transistor pulls up to the voltage state on the source terminal of PMOS transistor 116.

The logic of the inverter circuit reverses when the reference input clock signal toggles into a high-voltage logic state. For example, PMOS transistor 116 turns off, causing the common drain terminal connection of transistors 116, 120 to disconnect from power supply node 112. NMOS transistor 120, however, turns on and connects the common drain terminal connection of transistors 116, 120 with the grounded source terminal of NMOS transistor 120. Thus, the toggling of the reference input clock signal from a low-to-high voltage logic state effectively forces the common drain terminal connection of transistors 116, 120 into a low-voltage logic state.

Transistors 116, 120 may be replaced with an alternate type of inverting logic circuitry, such as a square wave inverting circuit, a quasi-wave or modified square inverting circuit, or a true sine wave inverting circuit. In other implementations, transistors 116, 120 may be replaced with an analog inverter comprising an oscillator and a transformer. For example, the oscillator drives the transistor, which interrupts its incoming direct current to create a square wave. The transistor drives the square wave through the transformer to produce an inverted output voltage. In some implementations, transistors 116, 120 may be replaced with a circuit that produces alternate forms of combinational logic, such as that produced by a NAND gate, a NOT gate, AND gate, OR gate, NOR gate, XOR gate, XNOR gate, or any combinations thereof.

PMOS transistor 106 has a gate terminal connected to the common drain terminal connection of transistors 116, 120, a source terminal connected to reference clock source 102, and a drain terminal connected to a first terminal of current blocking element 110. Accordingly, PMOS transistor 106 functions as a pass transistor that either passes the voltage on its source terminal to its drain terminal or blocks the source voltage from reaching its drain terminal based on the voltage received at its gate terminal. For example, PMOS transistor 106 turns offs when the common drain terminal connection of transistors 116, 120 drives the gate terminal of PMOS transistor 106 with a high-voltage logic state. This blocks the transfer of voltage between the source and drain terminals of PMOS transistor 106. However, as the output of transistors 116, 120 switches to a low-voltage logic state, PMOS transistor 116 is activated, allowing the reference input clock signal to travel from the source terminal of PMOS transistor 116 to the drain terminal of PMOS transistor 116.

Power supply node 112 connects second terminal of current blocking element 110, a first terminal of capacitor 114, and the source terminal of PMOS transistor 116. A second terminal of capacitor 114 connects to ground. In some implementations, the second terminal of capacitor 114 connects to either a positive power supply (e.g., VDD, a second VDD, etc.) or a negative power supply (e.g., VSS, a second VSS, etc.). Capacitor 114 stores electrical energy from the reference input clock signal during the charging phase (i.e., when the PMOS transistor 106 is activated), and discharges the stored electrical energy during the discharging phase (i.e., when PMOS transistor 106 is deactivated) to power the combinational logic of transistors 116, 120 and any other devices connected to power supply node 112. Downstream devices connected to power supply node 112 may include one or more clock buffers, a voltage controlled oscillator (VCO), a phase-locked loop (PLL), one or more gain stages, one or more mixers, or additional sets of combinational logic, which may each draw power from power supply node 112. The reference input clock signal and power supply node 112 provide the only source of power to circuit 100 (e.g., VDD for the combinational logic), the downstream devices, or both circuit 100 and the downstream devices. In some implementations, an external power supply or power regulator (e.g., a PMIC) may connect to power supply node 112 to decrease a start-up time for circuit 100, to decrease phase noise for circuit 100, to decrease phase noise on the reference input clock signal, to decrease phase noise for any downstream devices, or any combination thereof.

Notwithstanding the configuration of capacitor 114 described above, various modifications of capacitor 114 are contemplated within the scope of the present disclosure. For example, even though capacitor 114 has been described as being a single capacitor connected between power supply node 112 and ground, in at least some implementations, a plurality of capacitors may connect in parallel between power supply node 112 and ground. Likewise, in at least some implementations, multiple ones of the plurality of capacitors may share a switch or a different configuration of the switch for selectively adding and removing one or more of the plurality of capacitors from circuit 100.

Capacitor 114 may be an electrolytic capacitor, an aluminum electrolytic capacitor, a tantalum electrolytic capacitor, a super capacitor, a variable capacitor, a trimmer capacitor, a ceramic capacitor, a power film capacitor, polypropylene capacitor, a polycarbonate capacitor, a silver mica capacitor, an integrated-circuit (IC) capacitor, a super-capacitor, a double-layer capacitor, a pseudo-capacitor, or hybrid, capacitors. Similarly, while circuit 100 has been described to include an electrical energy storage element such as capacitor 114, in other implementations, other energy storage elements may be used in place of or in addition to capacitor 114, such as, a rechargeable battery, a superconducting magnetic energy storage (SMES), or any other suitable energy storage element.

In some implementations, circuit 100 may include a rectifier (not shown) for rectifying an AC signal into a DC voltage. For example, the rectifier may have a first terminal that connects to the input node and a second terminal that connects to a power node. Reference clock source 102 drives the first terminal of the rectifier with an AC signal. The rectifier produces a DC voltage on its second terminal by converting the AC signal to a DC voltage.

A transition phase occurs as circuit 100 toggles between the charging and discharging phase. As discussed herein, the voltage logic state on the inverter output (e.g., common drain terminal connection of transistor 116, 120) is opposite the voltage logic state on the inverter input. However, propagation and switching delays of the inverter formed by transistors 116, 120 may cause a low-voltage logic state to appear temporarily on both the input (e.g., common gate terminal connection) and output (e.g., common drain terminal connection) of the inverter. This allows a direct path to form unintentionally between capacitor 114 and reference clock source 102. Consequently, capacitor 114 may discharge energy into reference clock source 102 when the reference input clock signal transitions to a low-voltage logic state. Accordingly, the placement of current blocking element 110 (e.g., a resistor) between capacitor 114 and reference clock source 102 limits or prevents the back-flow of current from capacitor 114 to reference clock source 102.

Notwithstanding the configuration of current blocking element 110 described above to limit the current flow from power supply node 112 to reference clock source 102, various modifications of current blocking element 110 are contemplated within the scope of the present disclosure. For example, in at least some implementations, circuit 100 may further include a diode (not shown) having a first terminal connected to the drain terminal of PMOS transistor 106 and a second terminal connected to the first terminal of current blocking element 110. In other implementations, circuit 100 may omit current blocking element 110 and retain the diode such that the second terminal of the diode connects to power supply node 112. The diode may be a typical diode, a light-emitting diode (LED), a photodiode, a Schottky diode, a tunnel diode, a varicap, or a Zener diode. In some implementations, the first terminal of current blocking element 110 may be referred to as a first blocking terminal and the second terminal of current blocking element 110 may be referred to as a second blocking terminal.

Figure 2:
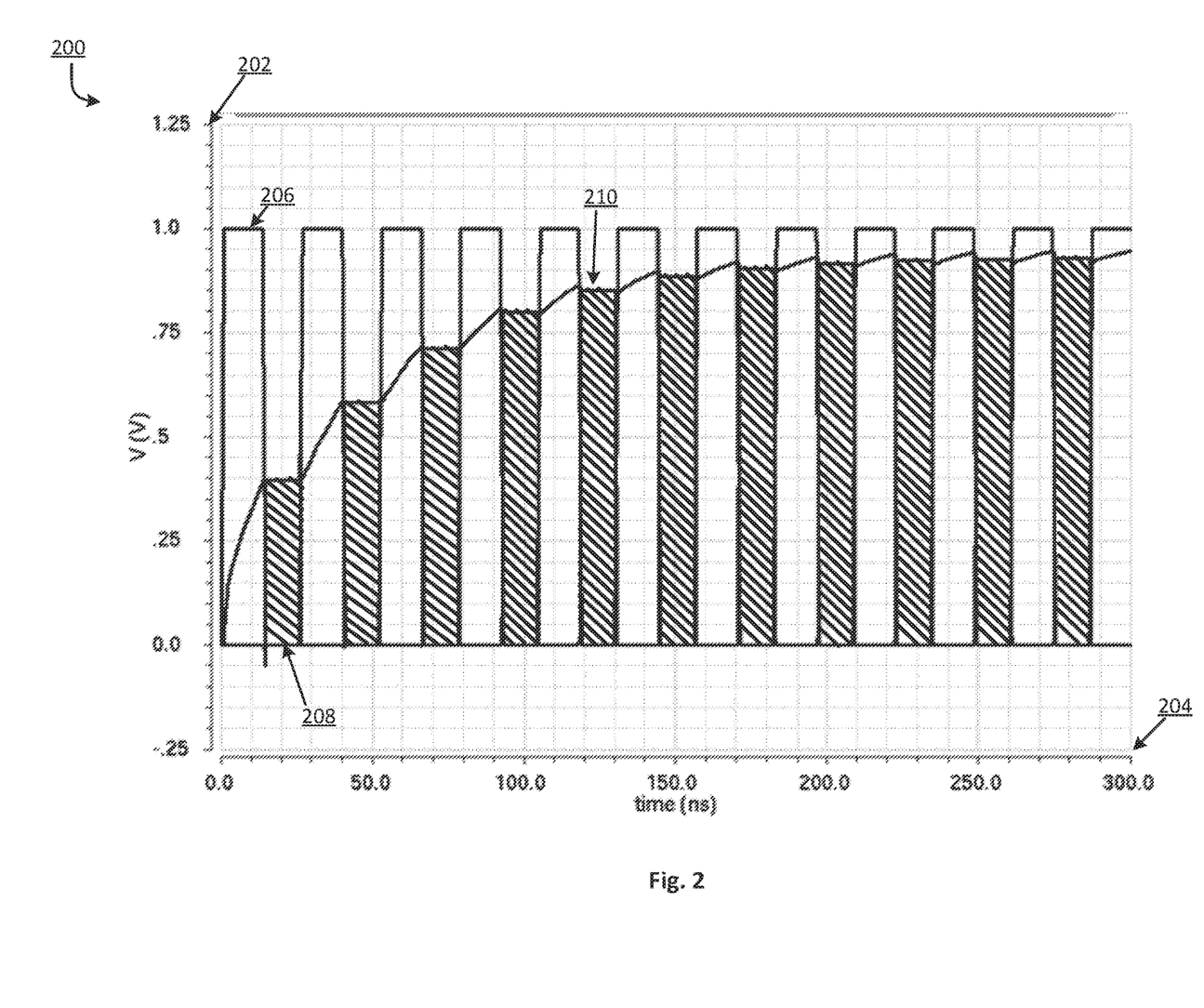
FIG. 2 is a time-based graph depicting superimposed voltage waveforms of the self-powered clock input buffer, in accordance with an illustrative implementation.

FIG. 2 is a time-based graph 200 depicting superimposed voltage waveforms of the self-powered clock input buffer of FIG. 1, in accordance with an illustrative implementation. The amplitudes of three voltage waveforms (i.e., waveforms 206, 208, and 210) are plotted on Y-axis 202 (from 0V to 1.0V) as a function of time along X-axis 204 (from 0 ns to 300 ns). FIG. 2, as with the other included figures, is shown for illustrative purposes only, and does not limit either the possible implementations of the present invention or the claims.

Waveform 206 illustrates the amplitude of the reference input clock signal produced from reference clock source 102 from FIG. 1. Waveform 206 drives both the source terminal of PMOS transistor 106 and the common gate terminal connection of transistors 116, 120. Waveform 206 illustrates the reference input clock signal measured at the source terminal of PMOS transistor 106. In some implementations, waveform 206 negligibly attenuates when it reaches the common gate terminal connection of transistors 116, 120. Accordingly, waveform 206 represents the amplitude of the reference input clock signal received by both PMOS transistor 106 and transistors 116, 120. Waveform 206, as shown, includes 11 cycles of an alternating current voltage signal oscillating from a minimum voltage of 0.0V up to a constant maximum voltage of 1.0V. Nevertheless, waveform 206 may continue beyond 11 cycles for up to any duration. Waveform 206, in some implementations, may have a maximum voltage above or below 1.0V, including negative values below 0V. Similarly, in some implementations, waveform 206 may have a minimum voltage above or below 0V.

Waveform 208 illustrates the amplitude of the output signal (also referred to herein as a control signal) produced by the inverter circuit formed by transistors 116, 120. Waveform 208 drives the gate terminal of PMOS transistor 106. Waveform 208 illustrates the inverter output signal measured at the common drain terminal connection of transistors 116, 120. In some implementations, waveform 208 negligibly attenuates when it reaches the gate terminal of PMOS transistor 106. Accordingly, waveform 208 represents the amplitude of the inverter output signal received by PMOS transistor 106. As shown, waveform 208 includes eleven cycles of an alternating current voltage signal oscillating from a minimum voltage of 0.0V up to a maximum voltage that varies as a function of time. For example, waveform 208 rises in amplitude for its first seven cycles and settles at a maximum voltage of approximately 0.9V after eight cycles. In addition, waveform 208 may continue beyond eleven cycles for up to any duration. Waveform 208, in some implementations, may have a maximum voltage at any point in time above or below 1.0V, including negative values below 0V. Similarly, in some implementations, waveform 208 may have a minimum voltage value above or below 0V.

Waveform 210 illustrates the rectified direct-current voltage signal of waveform 206 measured at power supply node 112, resulting from the charging and discharging of capacitor 114. For example, when waveform 206 toggles the inverter circuit of transistors 116, 120 into the high-voltage logic state, the combinational logic of transistors 116, 120 inverts waveform 208 into a low-voltage logic state. In turn, PMOS transistor 106 turns on, allowing for the instantaneous voltage of waveform 206 to charge capacitor 114. In some implementations, the charging of capacitor 114 occurs when the instantaneous voltage of waveform 206 exceeds the charge stored in capacitor 114. Conversely, when waveform 206 toggles to a low-voltage logic state, the combinational logic of transistors 116, 120 drives waveform 208 into a high-voltage logic state. Accordingly, PMOS transistor 106 turns off, which activates the discharging of capacitor 114 into the source terminal of transistor 116. After each cycle of waveform 206, capacitor 114 charges to an increasingly higher voltage until it reaches a maximum voltage set by the maximum voltage of waveform 206. The process of charging and discharging of capacitor 114 repeats for each cycle of waveform 206.

Figure 3:
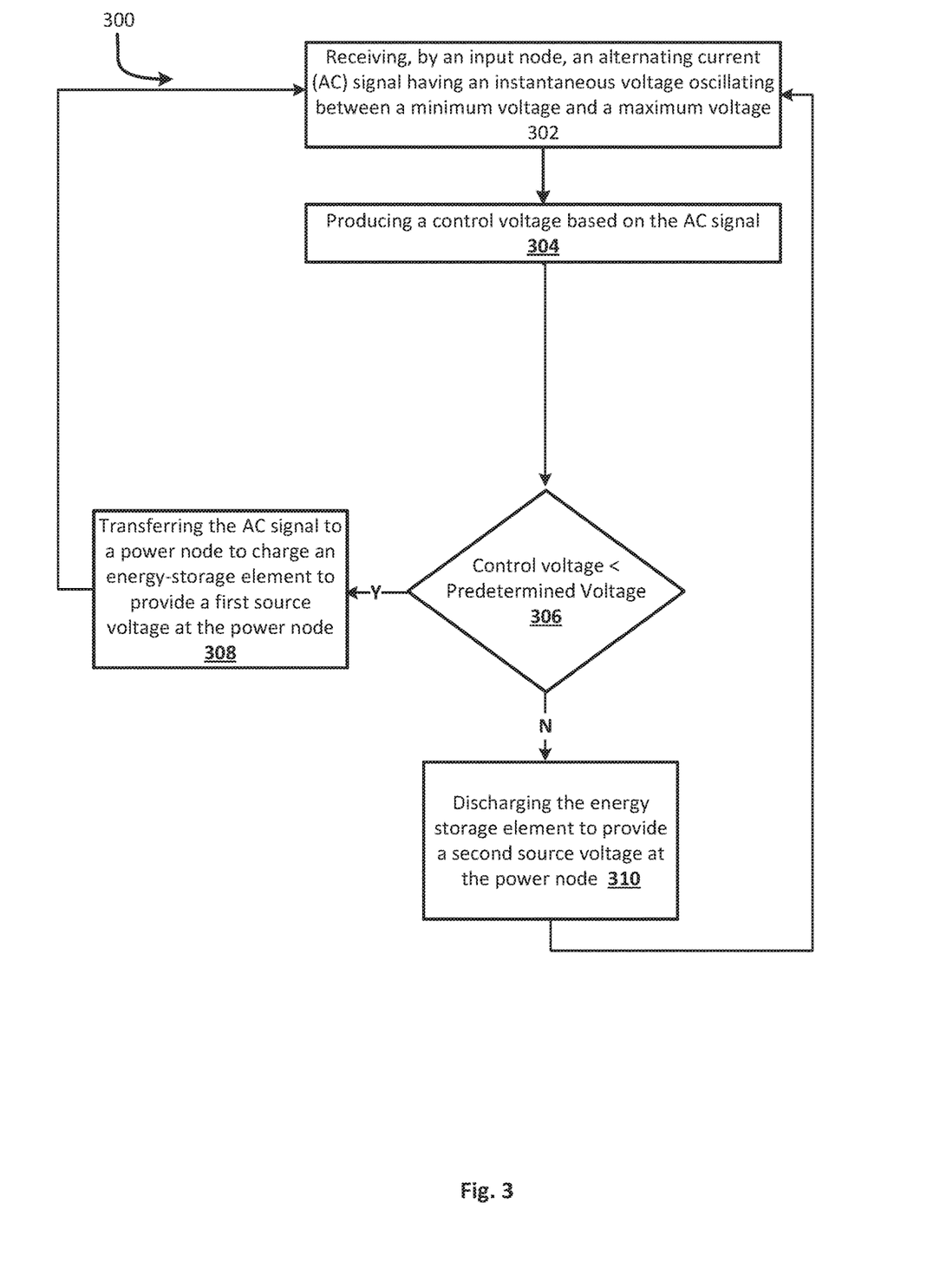
FIG. 3 is a flow diagram depicting a process for self-powering a clock input buffer, in accordance with an illustrative implementation.

FIG. 3 is a flow diagram depicting a process for self-powering a clock input buffer, in accordance with an illustrative implementation. Additional, fewer, or different operations may be performed depending on the implementation of the process. The process 300 may be implemented by a system such as the circuit 100 of FIG. 1. At operation 302, the system receives an alternating current (AC) signal at an input node. The AC signal has an instantaneous voltage oscillating between a minimum voltage and a maximum voltage. For example, the AC signal may be a reference input clock signal generated by reference input clock source 102, which is passed to the source terminal of PMOS transistor 106, and the common gate terminal connection of PMOS transistor 116 and NMOS transistor 120. The reference input clock signal may be AC-coupled to PMOS transistor 106 and the common gate terminal connection of PMOS transistor 116 and NMOS transistor 120 through a series DC-blocking capacitor (not shown). In some implementations, the reference input clock signal may be direct-coupled or DC-coupled to PMOS transistor 106 and the common gate terminal connection of PMOS transistor 116 and NMOS transistor 120.

In some implementations, the input node may connect to an antenna (not shown) and the antenna may receive the AC signal. By way of a non-limiting example, the antenna may be implemented as a planar inverted F (PIFA) antenna, a planar meander line antenna, a Marconi antenna, a helical antenna, a Hertzian antenna, a dipole antenna, a half-wave dipole antenna, a folded dipole antenna, a loop antenna, a folded loop antenna, modified dipole antenna, a triangular or bowtie dipole antenna, a log periodic dipole array (LPDA) antenna, a Yagi Uda antenna, or a parabolic reflector antenna.

At operation 304, the system produces a control voltage based on the received AC signal. In one implementation, the system produces the control voltage by inverting the logic state of the AC signal using an inverter circuit. To invert the signal, the system identifies the logic state of the AC signal by sampling the voltage of the AC signal at various points in time and comparing the voltage to a predetermined threshold value. For example, if the voltage of the AC signal falls below a predetermined threshold voltage, then the system defines the logic state for the AC signal as a low-voltage logic state. If the voltage of the AC signal rises above the predetermined threshold state, then the system defines the logic state as a high-voltage logic state. To invert the signal, the system converts a low-voltage logic state to a high-voltage logic state, and a high-voltage logic state to a low-voltage logic state. In some implementations, the system may invert the logic-state of the AC signal to produce the control voltage by using an inverter circuit comprising a plurality of transistors adapted to form a logic gate. In one implementation, the inverter circuit includes PMOS transistor 116 and NMOS transistor 120 of FIG. 1, each having their respective gate terminals connected to a sensing terminal and their respective drain terminals connected to an output terminal. The system drives the sensing terminal with the reference clock input signal from reference clock source 102. Transistors 116, 120 produce a signal in the high-voltage logic state when the reference clock transitions into a low-voltage logic state. Conversely, transistors 116, 120 produce a signal in the low-voltage logic state when the reference input clock signal transitions to the high-voltage logic state. The produced control signal appears on the output terminal. In some implementations, the AC signal powers the inverter circuit. In some implementations, the AC signal powers the logic gate when the instantaneous voltage of the AC signal rises above the voltage source provided by the energy-storage element.

At operation 306, the control voltage is received at a gate terminal of a pass transistor and causes activation or deactivation of the pass transistor based on whether the control voltage exceeds a threshold voltage of the pass transistor. For example, PMOS transistor 106 of FIG. 1 receives the control voltage from the common drain terminal connection of transistors 116 and 120. If the control voltage at the gate of the pass transistor falls below the threshold voltage of the pass transistor, then the pass transistor is activated and the process proceeds to operation 308. However, if the gate terminal voltage equals to or exceeds the threshold voltage, then the pass transistor is deactivated and the process proceeds to operation 310. In other words, the gate terminal voltage controls whether process 300 enters the "charging phase" of operation 308 or the "discharging phase" of operation 310.

At operation 308, when the pass transistor 106 is activated, the pass transistor 106 transfers the AC signal from an input node to a power node. Activating the pass transistor causes transfer of a voltage between a first transfer terminal of the pass transistor and a second transfer terminal of the pass transistor. When the pass transistor 106 is activated, the AC signal both charges an energy-storage element and provides a first source voltage at the power node. Referring to FIG. 1, PMOS transistor 106 activates when the common drain terminal connection of transistors 116, 120 drives the gate terminal of PMOS transistor 106 with a low-voltage logic state. When activated, PMOS transistor 106 allows the reference input clock signal to force a charge across the current blocking element 110 and into the capacitor 114. During this charging phase of capacitor 114, the reference input clock signal provides power to both the capacitor and the clock input buffer, including any downstream devices connected to the capacitor. At the end of operation 308, the process returns to operation 302.

At operation 310, when the pass transistor 106 is deactivated, the pass transistor 106 prevents passage of the AC signal from the input node 104 to the power node 112. In this state, the energy storage element discharges, thereby providing a second source voltage at the power node. For example, PMOS transistor 106 turns offs when the common drain terminal connection of transistors 116, 120 drives the gate terminal of PMOS transistor 106 with a high-voltage logic state. This prevents the transfer of the instantaneous voltage of the reference input clock from its drain terminal to its source terminal. Accordingly, capacitor 114 may discharge through the source terminal of PMOS 116. In some implementations, capacitor 114 discharges through the source terminal of PMOS 116 and any downstream devices connected to power supply node 112. In other words, PMOS 116 and the downstream device each draw power from the capacitor in the "discharging phase." At the end of operation 308, the process returns to operation 302.

Due to the nature of the AC signal, the control voltage will toggle between high and low logic states, thereby causing operations 308 and 310 to alternate. A transition phase may occur as the circuit toggles between operations 308 and 310. In normal operation, the voltage logic state on an output of the inverter circuit is opposite the voltage logic state on the input of inverter circuit. However, propagation and switching delays of the inverter circuit may cause a low-voltage logic state to appear temporarily on both the input and the output of the inverter circuit. This allows a direct path to form unintentionally between the energy storage element (e.g., capacitor 114) and reference clock source 102. Consequently, capacitor 114 may discharge energy into reference clock source 102 when a reference input clock signal transitions to a low-voltage logic state. Accordingly, in an implementation, a current-blocking element may be used to block the unwanted current flow.

The various implementations illustrated and described are provided merely as examples to illustrate various features of the claims. However, features shown and described with respect to any given implementation are not necessarily limited to the associated implementation and may be used or combined with other implementations that are shown and described. Further, the claims are not intended to be limited by any one example implementation.

The foregoing method descriptions and the process flow diagrams are provided merely as illustrative examples and are not intended to require or imply that the steps of various implementations must be performed in the order presented. As will be appreciated by one of skill in the art the order of steps in the foregoing implementations may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary implementations, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed implementations is provided to enable any person skilled in the art to make or use the present disclosure. Various modifications to these implementations will be readily apparent to those skilled in the art, and the generic principles defined herein may be applied to some implementations without departing from the spirit or scope of the disclosure. Thus, the present disclosure is not intended to be limited to the implementations shown herein but is to be accorded the widest scope consistent with the following claims and the principles and novel features disclosed herein.

What is claimed is:

1. A self-powered clock input buffer comprising:
   an input node configured to receive an input clock signal;
   an output node configured to provide an output clock signal;
   a pass transistor comprising:
      a gate terminal,
      a source terminal coupled to the input node; and
      a drain terminal;
   a resistor comprising:
      a first terminal exclusively connected to the drain terminal of the pass transistor, wherein the drain terminal of the pass transistor is exclusively connected to the first terminal; and
      a second terminal;
   an energy-storage element comprising a first terminal directly connected to the second terminal of the resistor;
   a plurality of transistors comprising:
      a sensing terminal coupled to the input node configured to receive the input clock signal; and
      an output terminal coupled to the gate terminal of the pass transistor and to the output node of the clock input buffer and configured to output an inverted input clock signal,
   wherein the pass transistor is configured to alternatively charge and discharge the energy-storage element based at least in part on the output clock signal, and
   the energy-storage element is configured to supply power to the plurality of transistors.

2. The clock input buffer of claim 1, wherein the input node is directly coupled to a signal source that provides the input clock signal.

3. The clock input buffer of claim 1, wherein the plurality of transistors is configured to invert the input clock signal.

4. The clock input buffer of claim 1, wherein the input clock signal powers the plurality of transistors when an instantaneous voltage of the input clock signal rises above a voltage source provided by the energy-storage element.

5. The clock input buffer of claim 4, wherein the plurality of transistors comprises:
   a first transistor comprising:
      a first source terminal coupled to the drain terminal of the pass transistor;
      a first gate terminal connected to the sensing terminal; and
      a first drain terminal connected to the output terminal; and
   a second transistor comprising:
      a second source terminal connected to a ground connection;
      a second gate terminal connected to the first gate terminal; and
      a second drain terminal connected to the output terminal.

6. The clock input buffer of claim 5, wherein the first transistor is a PMOS transistor and the second transistor is an NMOS transistor.

7. The clock input buffer of claim 1, further comprising a phase-lock loop configured to use the input clock signal as a reference clock.

8. The clock input buffer of claim 7, wherein the phase-lock loop receives the input clock signal via the input node.

9. The clock input buffer of claim 1, further comprising a clock buffer coupled to the drain terminal of the pass transistor, wherein the clock buffer draws power from the drain terminal of the pass transistor.

10. The clock input buffer of claim 1, wherein the input node is AC coupled to a signal source that provides the input clock signal.

11. A method for self-powering a clock input buffer, the method comprising:
   receiving, by an input node, an input clock signal;
   producing a control voltage based on the input clock signal;
   transferring, by a pass transistor, the input clock signal to a first terminal of an energy-storage element during a first portion of a cycle of the input clock signal based on the control voltage, the transferred input clock signal charging the energy-storage element and providing a first source voltage at the first terminal of the energy-storage element, wherein the pass transistor comprises a source terminal coupled to the input node and a drain terminal;

blocking a current flow by a resistor comprising a first terminal exclusively connected to the drain terminal of the pass transistor and a second terminal directly connected to the first terminal of the energy-storage element, wherein the drain terminal of the pass transistor is exclusively connected to the first terminal;

discharging the energy-storage element during a second portion of the cycle of the input clock signal to provide a second source voltage at the first terminal of the energy-storage element; and providing, at an output node, an output clock signal, wherein the output clock signal is inverted with respect to the input clock signal.

12. The method of claim 11, further comprising charging the energy-storage element when an instantaneous voltage of the input clock signal rises above the second source voltage provided by the energy-storage element.

13. The method of claim 11, wherein producing the control voltage based on the input clock signal comprises inverting the input clock signal.

14. The method of claim 11, wherein transferring the input clock signal comprises receiving the control voltage at a gate terminal of a pass transistor to activate the pass transistor, wherein activating the pass transistor causes transfer of a voltage between the source terminal of the pass transistor coupled to the input node and the drain terminal of the pass transistor coupled to the first terminal of the energy-storage element.

15. The method of claim 14, wherein producing the control voltage comprises inverting the input clock signal using a plurality of transistors configured to form a logic gate, the logic gate having a sensing terminal coupled to the input node and an output terminal coupled to the gate terminal of the pass transistor.

16. The method of claim 15, further comprising providing power to the logic gate from the input clock signal when an instantaneous voltage of the input clock signal rises above a voltage provided by the energy-storage element.

17. The method of claim 15, further comprising providing power to the logic gate from the second source voltage when an instantaneous voltage of the input clock signal is less than the second source voltage.

18. The method of claim 11, wherein receiving the input clock signal comprises receiving a DC signal component of the input clock signal.

19. The method of claim 18, further comprising providing the input clock signal as a reference clock to a phase-lock loop.

20. The method of claim 19, wherein the input clock signal is received only via the input node.

21. A circuit for a self-powered clock input buffer, the circuit comprising:

an input node adapted to receive an input clock signal, the input node being directly coupled to a signal source that provides the input clock signal;

a rectifier configured to rectify an alternating current signal into a direct-current voltage, the rectifier having a first terminal coupled to the input node and a second terminal;

an energy-storage element; and a resistor comprising a first resistor terminal exclusively connected to the second terminal of the rectifier and a second resistor terminal directly connected to a first terminal of the energy-storage element, wherein the second terminal of the rectifier is exclusively connected to the first resistor terminal.

22. The circuit of claim 21, wherein the input clock signal is a reference clock for a phase-lock loop.

23. The circuit of claim 21, further comprising a clock buffer adapted to receive a direct-current voltage from the first terminal of the energy-storage element as an only source of power for the clock buffer.

24. A method for self-powering a clock input buffer, the method comprising:

receiving, by an input node, an input clock signal, wherein the input clock signal includes an alternating current signal;

converting, by a rectifier, the alternating current signal into a direct-current voltage, wherein the rectifier comprises a first terminal coupled to the input node and a second terminal;

storing the direct-current voltage in an energy-storage element;

resisting current flow, by a resistor comprising a first terminal exclusively connected to the second terminal of the rectifier and a second terminal directly coupled to a first terminal of the energy-storage element, wherein the second terminal of the rectifier is exclusively connected to the first terminal of the resistor; and discharging the energy-storage element into a clock buffer, the energy-storage element providing an only source of power for the clock buffer.

25. The method of claim 24, wherein receiving the input clock signal comprises receiving a DC signal component of the input clock signal.

* * * * *